(12) United States Patent
Shah et al.

(10) Patent No.: US 10,673,853 B2
(45) Date of Patent: Jun. 2, 2020

(54) METHOD AND SYSTEM FOR EXECUTING A TRANSACTION REQUEST USING A COMMUNICATION CHANNEL

(71) Applicant: Tata Consultancy Services Limited, Mumbai (IN)

(72) Inventors: Viral Prakash Shah, Mumbai (IN); Shobhit Shukla, Mumbai (IN); Ikshita Jain, Mumbai (IN); Meenal Keshore, Mumbai (IN); Ramprasad Dhakad, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 4 days.

(21) Appl. No.: 15/469,182

(22) Filed: Mar. 24, 2017

(65) Prior Publication Data
US 2018/0198792 A1    Jul. 12, 2018

(30) Foreign Application Priority Data
Jan. 11, 2017   (IN) .............................. 201721001154

(51) Int. Cl.
*H04L 29/06* (2006.01)
*G06Q 10/10* (2012.01)
*H04L 12/58* (2006.01)

(52) U.S. Cl.
CPC .......... *H04L 63/10* (2013.01); *G06Q 10/107* (2013.01); *H04L 51/18* (2013.01); *H04L 63/083* (2013.01); *H04L 63/0807* (2013.01); *H04L 63/0876* (2013.01)

(58) Field of Classification Search
CPC ... H04L 63/10; H04L 63/0807; H04L 63/083; H04L 63/105; H04L 63/0876; H04L 51/18; G06Q 10/107
See application file for complete search history.

(56) References Cited

U.S. PATENT DOCUMENTS

| | | | |
|---|---|---|---|
| 8,751,276 B2 | 6/2014 | Gillis et al. | |
| 9,237,231 B2 | 1/2016 | Swanburg et al. | |
| 2004/0015840 A1 | 1/2004 | Walker | |
| 2005/0259590 A1* | 11/2005 | Brown | ................. H04Q 3/0075 370/250 |
| 2007/0167178 A1 | 7/2007 | Al-Harbi | |
| 2015/0161585 A1* | 6/2015 | Huster | ............... G06Q 20/3224 705/44 |

(Continued)

*Primary Examiner* — Daniel B Potratz
*Assistant Examiner* — William B Jones
(74) *Attorney, Agent, or Firm* — Finnegan, Henderson, Farabow, Garrett & Dunner LLP

(57) ABSTRACT

A method and system for executing a transaction request using a communication channel such as SMS or email has been described. The disclosure provides a proactive/reactive smart response processing system/framework for providing capability to a user to take action from any channel other than desktop. This system takes care of authentication as well by generating a unique key Reply Capture ID Code (RCID) and incorporating it as part of response thus ensuring that the action is being taken from authentic source. The RCID based logic lets each user to be authenticated and at the same time acts a portable token for the transactional request. The invention creates a generic methodology by which responses to communications can be captured and processed via a centralized ERP system.

10 Claims, 5 Drawing Sheets

(56) References Cited

U.S. PATENT DOCUMENTS

| | | | |
|---|---|---|---|
| 2015/0281920 A1 | 10/2015 | Dhanyamraju et al. | |
| 2015/0341333 A1* | 11/2015 | Feng .................. | G06Q 20/3276 713/168 |
| 2016/0012465 A1* | 1/2016 | Sharp .................... | G06Q 20/18 705/14.17 |
| 2017/0041296 A1* | 2/2017 | Ford .................... | H04W 12/02 |

* cited by examiner

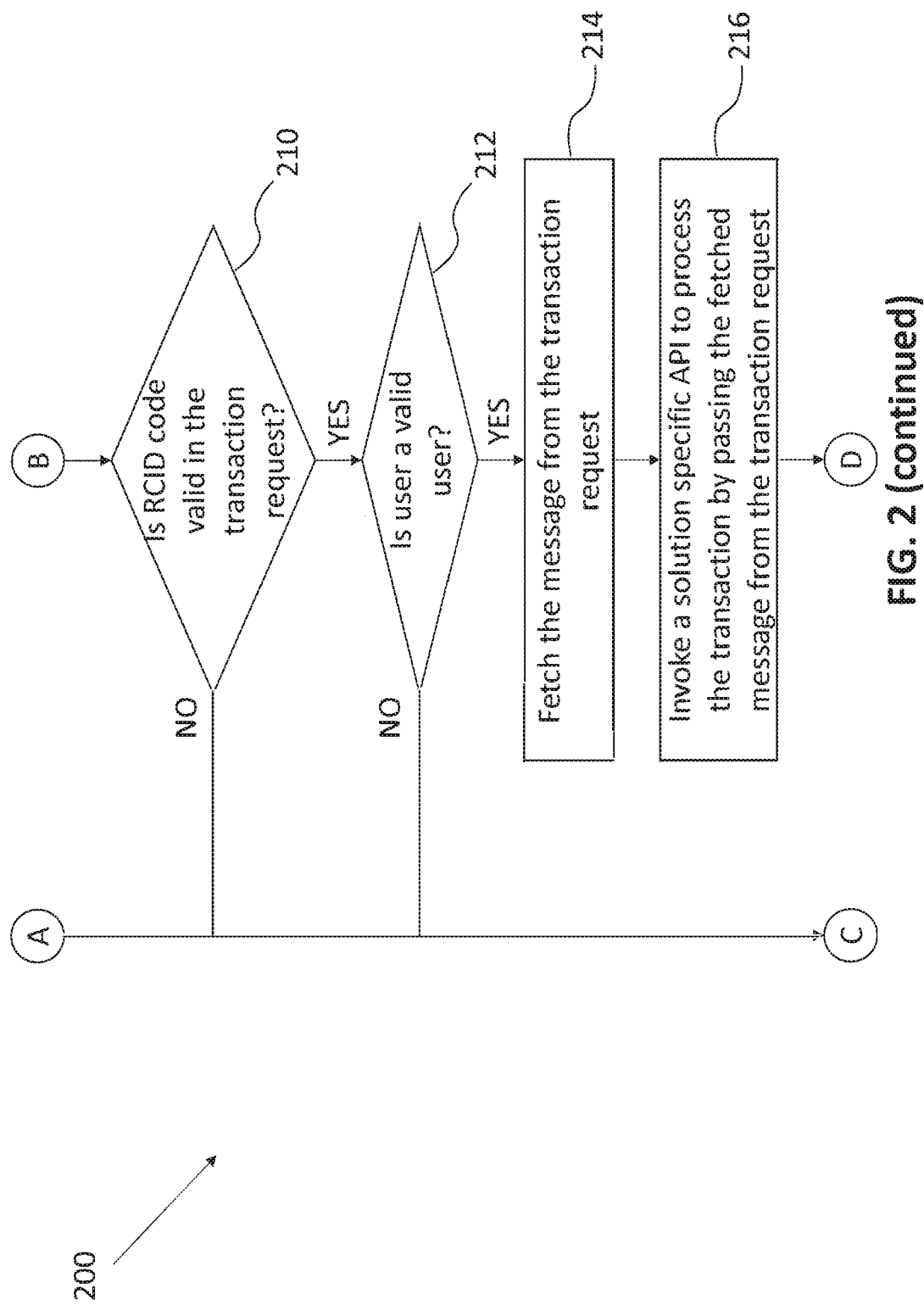

METHOD AND SYSTEM FOR EXECUTING A TRANSACTION REQUEST USING A COMMUNICATION CHANNEL

PRIORITY CLAIM

This U.S. patent application claims priority under 35 U.S.C. § 119 to: India Application No. 201721001154, filed on 11 Jan. 2017. The entire contents of the aforementioned application are incorporated herein by reference.

TECHNICAL FIELD

The present application generally relates to the field of secure information transaction. More particularly, but not specifically, the invention provides a system and method for securely executing a transaction request using a communication channel such as SMS or email.

BACKGROUND

In a corporate environment, there are various scenarios when a request is generated. This request is communicated through various modes of communication such as email, messages, websites, servers, calls etc. These requests sometime contains a lot of critical and important information. Sometimes, these information require quick and timely attention. In addition to that, a lot of confidential data is also being communicated, therefore, the information communicated over these channels must be secure. The requests are generated in the system either proactively or reactively by a user. These requests need to be attended by an authentic stakeholder such as a senior or an admin person, before it is attended.

In such cases the current practice involves, the authentic stakeholder access his/her desktop or laptop, logging in to the system, going to the web location or path where the request has been arrived and then taking an action on the request. But there are various scenario, where the desktop is not accessible to the senior. This results in delay from the side of authentic stakeholder in attending the request. In case of emergency, a system/framework is required which can provide a capability to the user to take action from any other channel other than the desktop/laptop.

Generally, the information is available in the graphical system, but user needs to search through records to attend the request which requires action. The existing communication via Email or SMS is supported however the channels are passively used as they are not actionable. Further security of data may be compromised over these channels. In addition to that, there is also demand of portable applications which can be carried easily over a smart phones. Portable application creation for smart phones and tablets requires additional effort and may be complicated based on the present design of ERP. In the existing systems, even if the user has the information which is already communicated via other channels, he/she still needs to go through redundant number of steps to take action.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, in one embodiment herein provides a system for executing a transaction request using a communication channel. The system comprises a memory, a transaction engine, a database and a processor. The transaction engine sends the transaction request. The transaction request comprises a transaction request ID, a transaction type, a user ID, an organization ID, a short code, a reply capture ID code (RCID code) and a message. The database stores the transaction request. The processor further comprises a short code validation module, an RCID code checking module, an RCID code validation module, a user validation module, a fetching module, an invoke module and execution module. The short code validation module checks the validity of the short code in the transaction request. The RCID code checking module checks the presence of the RCID code in the transaction request. The RCID code validation module checks the validity of the RCID code in the transaction request if the RCID code is present. The user validation module checks the validity of a user using the user ID. The fetching module fetches the message from the transaction request. The invoke module invokes a solution specific API to process the transaction by passing the fetched message from the transaction request. The execution module executes the transaction and sends a success-failure response to the user indicating a transaction request status.

Another embodiment provides a method for executing a transaction request using a communication channel. Initially, the transaction request is received from a transaction engine. The transaction request comprising a transaction request ID, a transaction type, a user ID, an organization ID, a short code, a reply capture ID code (RCID code) and a message. At the next step, the validity of the short code in the transaction request is checked. An error message is sent if the short code is invalid. Else in the next step, the presence of the RCID code is checked in the transaction request. In the next step, the validity of the RCID code in the transaction request is checked if the RCID code is present. An error message is sent if the RCID code is invalid. Else in the next step the validity of a user is checked using the user ID. An error message is sent if the user is invalid. In the next step, the message is fetched from the transaction request. In the next step, a solution specific API is invoked to process the transaction by passing the fetched message from the transaction request. And finally, the transaction is executed and a success-failure response is sent to the user indicating a transaction request status.

In yet another embodiment, a non-transitory computer readable medium storing instructions which when executed by a possessor on a system, cause the processor to perform method for executing a transaction request using a communication channel. Initially, the transaction request is received from a transaction engine. The transaction request comprising a transaction request ID, a transaction type, a user ID, an organization ID, a short code, a reply capture ID code (RCID code) and a message. At the next step, the validity of the short code in the transaction request is checked. An error message is sent if the short code is invalid. Else in the next step, the presence of the RCID code is checked in the transaction request. In the next step, the validity of the RCID code in the transaction request is checked if the RCID code is present. An error message is sent if the RCID code is invalid. Else in the next step the validity of a user is checked using the user ID. An error message is sent if the user is invalid. In the next step, the message is fetched from the transaction request. In the next step, a solution specific API is invoked to process the transaction by passing the fetched message from the transaction request. And finally, the transaction is executed and a success-failure response is sent to the user indicating a transaction request status.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
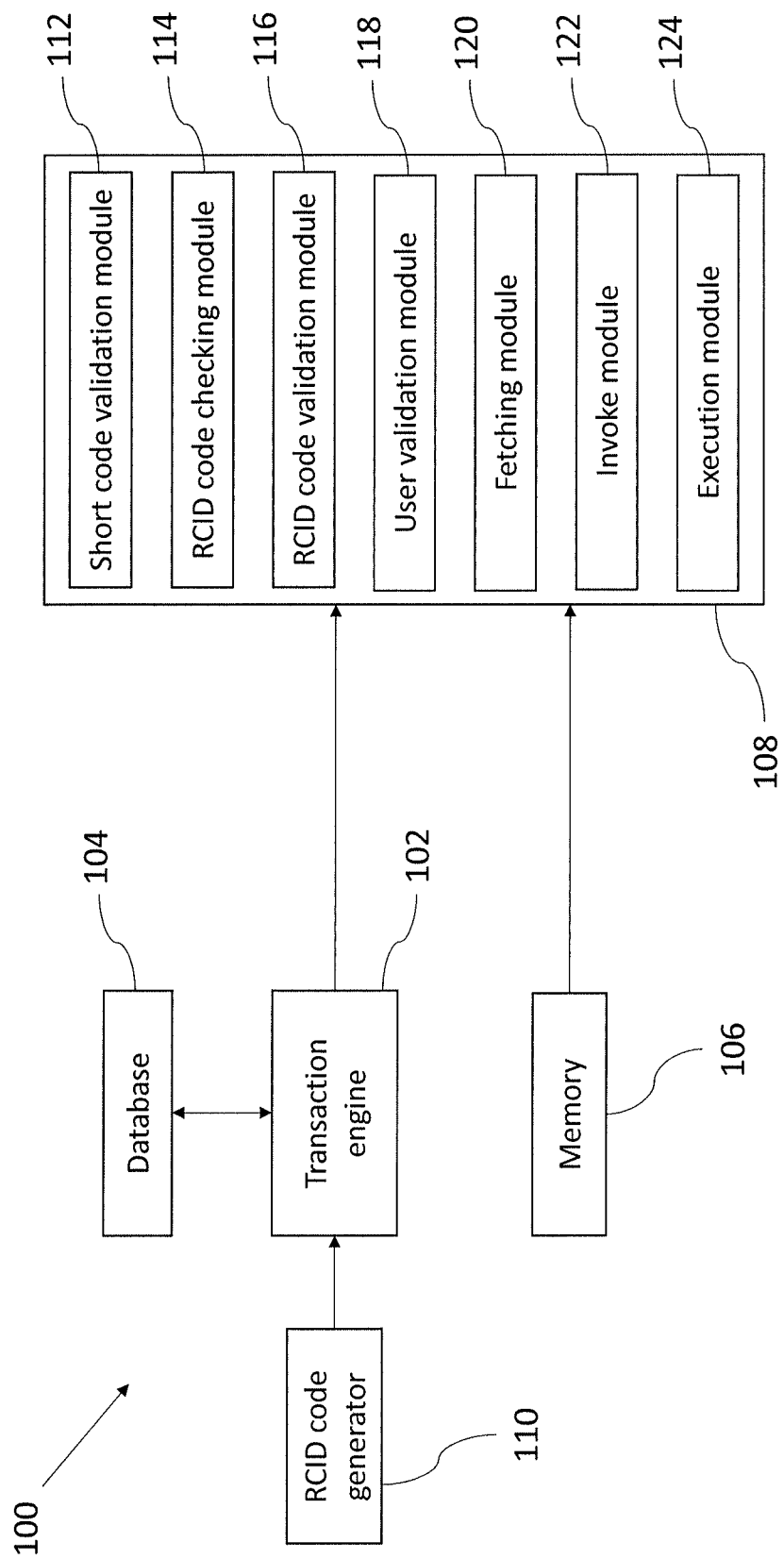
FIG. 1 illustrates a block diagram of a system for executing a transaction request using a communication channel, in accordance with an embodiment of the disclosure.

Referring now to the drawings, and more particularly to FIG. 1, where similar reference characters denote corresponding features consistently throughout the figures, there are shown preferred embodiments and these embodiments are described in the context of the following exemplary system and/or method.

According to an embodiment of the disclosure, a system 100 for executing a transaction request using a communication is shown in the block diagram of FIG. 1. The disclosure provides a proactive/reactive smart response processing system/framework for providing capability to a user to take action from any channel other than desktop. This system takes care of authentication as well by generating a unique key and incorporating it as part of response thus ensuring that the action is being taken from authentic source. This framework has mapping with integrating solutions business logic, which is called based on the response provided.

The system 100 includes a transaction engine 102, a database 104, a memory 106 and a processor 108 in communication with the memory 106 as shown in the block diagram of FIG. 1. The memory 106 is configured to store a plurality of algorithms. The processor 108 further includes a plurality of modules for performing various functions. The plurality of modules access the plurality of algorithms stored in the memory 106 to perform various functions. The plurality of modules include an RCID code generator 110, a short code validation module 112, an RCID code checking module 114, an RCID code validation module 116, a user validation module 118, a fetching module 120, an invoke module 122 and execution module 124.

According to an embodiment of the disclosure, the transaction engine 102 is configured to generate a transaction request. The transaction engine 102 is normally controlled by a user. The transaction request can be generated either proactively or reactively. In an example, the transaction request comprises a transaction request ID, a transaction type, a user ID, an organization ID, a short code, a reply capture ID code (RCID code) and a message. The short code and the reply capture ID code (RCID code) are the essential part of the transaction request. Though it should be appreciated that the rest other components of the transaction request can be customized depending on the requirement of the user. These transaction requests are stored in the database 104. The transaction requests can further be fetched based on the requirement.

The RCID code is a unique alpha numeric 8 digit character code. The RCID code is a singular and arbitrary alpha numeric string. The RCID code is generated by an RCID code generator 110. The RCID code is stored in the database 104 along with other transaction details such as transaction type, transaction ID, user ID, organization ID, solution ID. Once the RCID code is generated, the database 104 is queried to check the uniqueness of the RCID code and further it is embedded in the notification being sent for the transaction. The RCID code expires after its consumption.

The short code is a unique code which is entered in the database 104 at time of integration with solutions against a business logic which is to be implemented once action is taken on the transaction request. The short code is fetched from table and embedded in the notification as subject line.

According to an embodiment of the disclosure, once the transaction request is generated, the short code validation module 112 checks the validity of the short code present in the transaction request. If the short code is not valid then the processor 108 sends an error report back to the user. In an example, the short code is prepended with '' while sending the communication. Hence the short code validation module 112 looks for '' in subject line and anything post '**' is taken as the short code. The example of short code may be WF for workflow, HD for Help Desk etc.

According to an embodiment of the disclosure, if the short code is a valid short code then the RCID code checking module 114 checks the presence of the RCID code in the transaction request. If the RCID code is not present then the error report is sent back to the user. If the RCID code is present then the RCID code validation module 114 checks the presence and validity of the RCID code. It should be appreciated that in another embodiment, if the RCID code is not present then it is assumed that the transaction request is a proactive request, else it is a reactive request.

The RCID code validation module 116 initially queries a RCID code table to check whether the RCID code is present in the RCID code table or not. The RCID code table is table consisting of all the recently generated RCID codes. Whenever any action is taken, the RCID code is consumed or within 15 days, the RCID code is consumed. Hence on fetching the RCID code, the table is queried to check whether the RCID code is present. If present, then processing proceeds else the error report is sent to user saying RCID code is invalid. According to an embodiment of the disclosure, if the RCID code is present in the transaction then the validation of user is done by the user validation module 118 to ensure that the transaction has come from an authentic person to whom the message was actually sent (in case of reactive request). For this the user ID stored in table at time of the RCID code generation is queried to fetch the communication ID tagged to this user. Communication ID could be an email ID or a mobile number depending on the type of communication. The communication ID from which response has been received is checked. If both the communication IDs are same then, the transaction message is considered as authentic and processed else the error report is sent to the user.

According to an embodiment of the disclosure, for proactive transaction requests as mentioned above, there is no RCID code hence the RCID validation module 116 is not required in the case of proactive transaction request. In such cases, the user validation module 118 checks if the communication ID is registered in the system or not to ensure the transaction request has come from the authenticated user. If registration is done then this transaction request is processed further for taking action else user friendly message is sent to end sure saying the communication ID is not registered in the system.

According to an embodiment of the disclosure, the system 100 further includes the fetching module 120, the invoke module 122 and the execution module 124. The fetching module 120 fetches the action item from the transaction request if all the conditions are met, i.e. the transaction request has the valid RCID code, the valid short code and the user is a valid user. The invoke module 122 is configured to invoke a solution specific API to process the transaction by passing the fetched message from the transaction request. And the execution module 124 is configure to execute the transaction. The short code is queried in the table and the business logic class mapped to this short code is fetched and executed with the message xml as input. Depending on the final status of the transaction request, the execution module 124 also configured to send a success or failure response to the user indicating a transaction request status.

Figure 3:
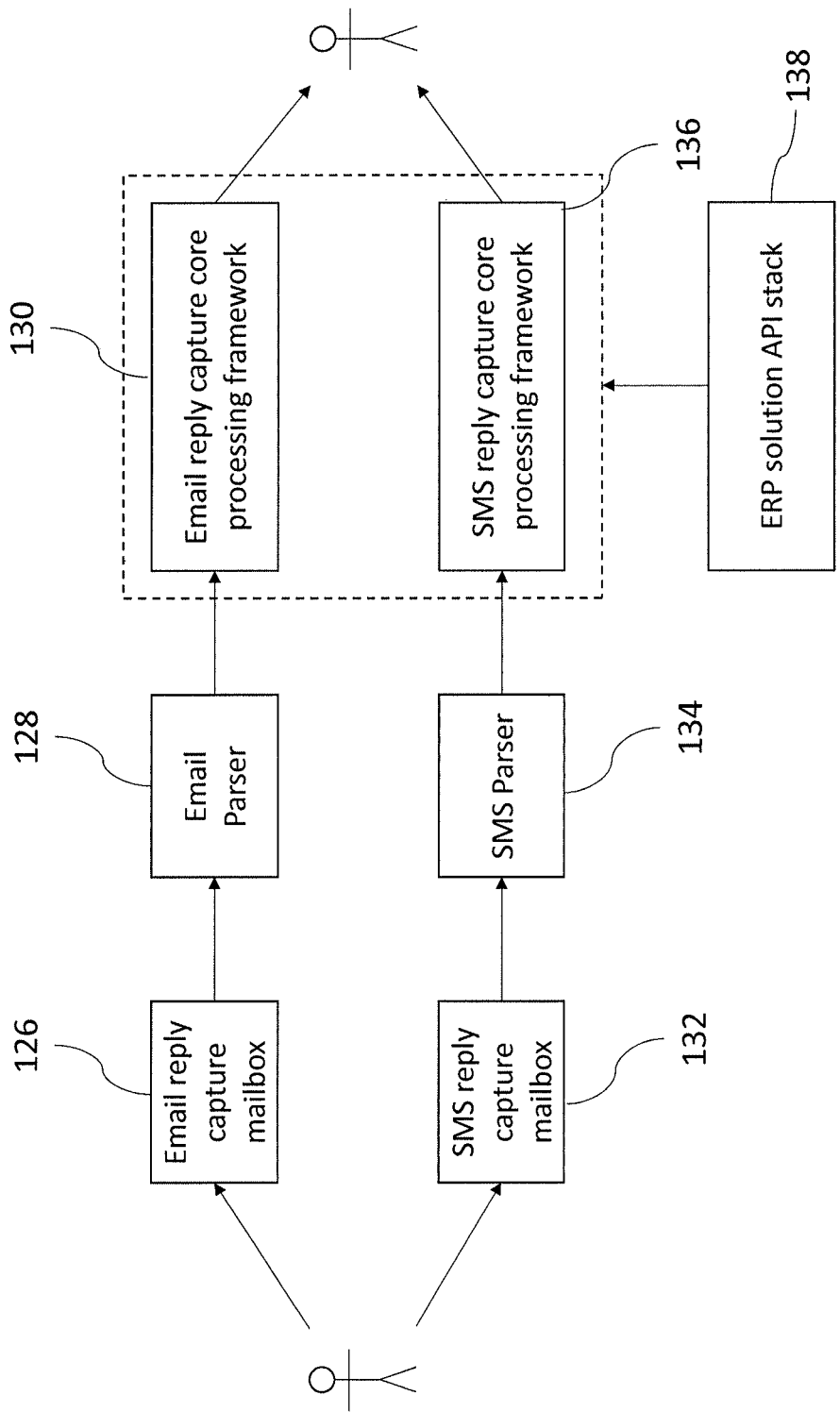
FIG. 3 is a flowchart illustrating steps involved in executing a transaction request using a communication channel, in accordance with an embodiment of the disclosure.

According to an embodiment of the disclosure, the transaction request is processed via a centralized ERP solution API stack 138 as shown in FIG. 3. Majority of ERP systems use various interfaces to communicate and interact with end user. Every module of the system is designed keeping in mind, management of information and represents it methodically, for user to take appropriate action. Conventionally this information is represented on a graphical interface using web or client based applications. This makes it important for a user to be authenticated and authorized using passwords in order to take action on a given request. This invention helps to achieve portability and user friendly ways to interact with the system. It allows end users to configure the experience and with multi-tenant architecture it allows the same generic implementation to be implemented across different organizations.

Figure 2:
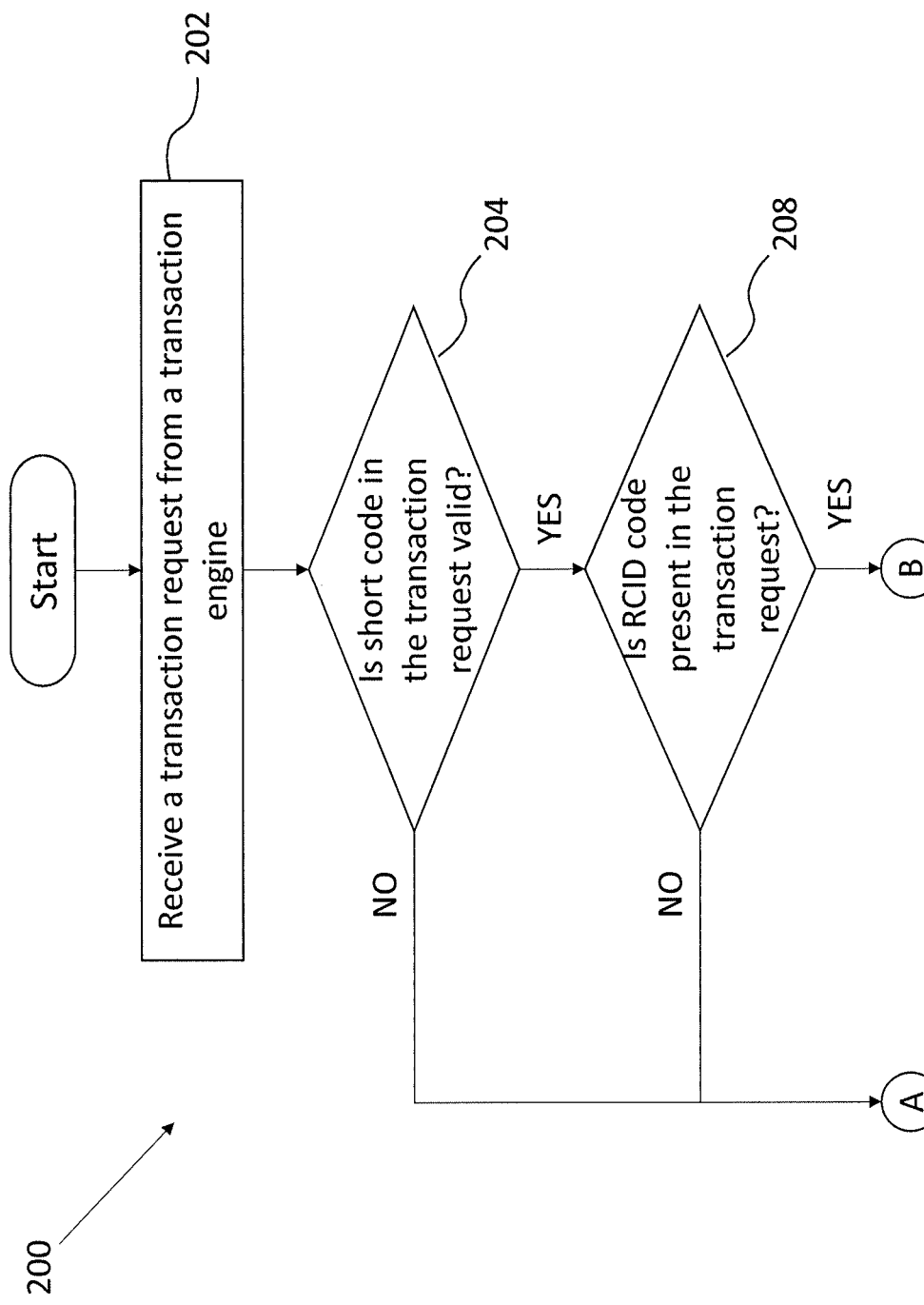
FIG. 2 illustrates an schematic diagram of the system for executing transaction request using SMS and email, in accordance with an embodiment of the present disclosure.
Figure 2:
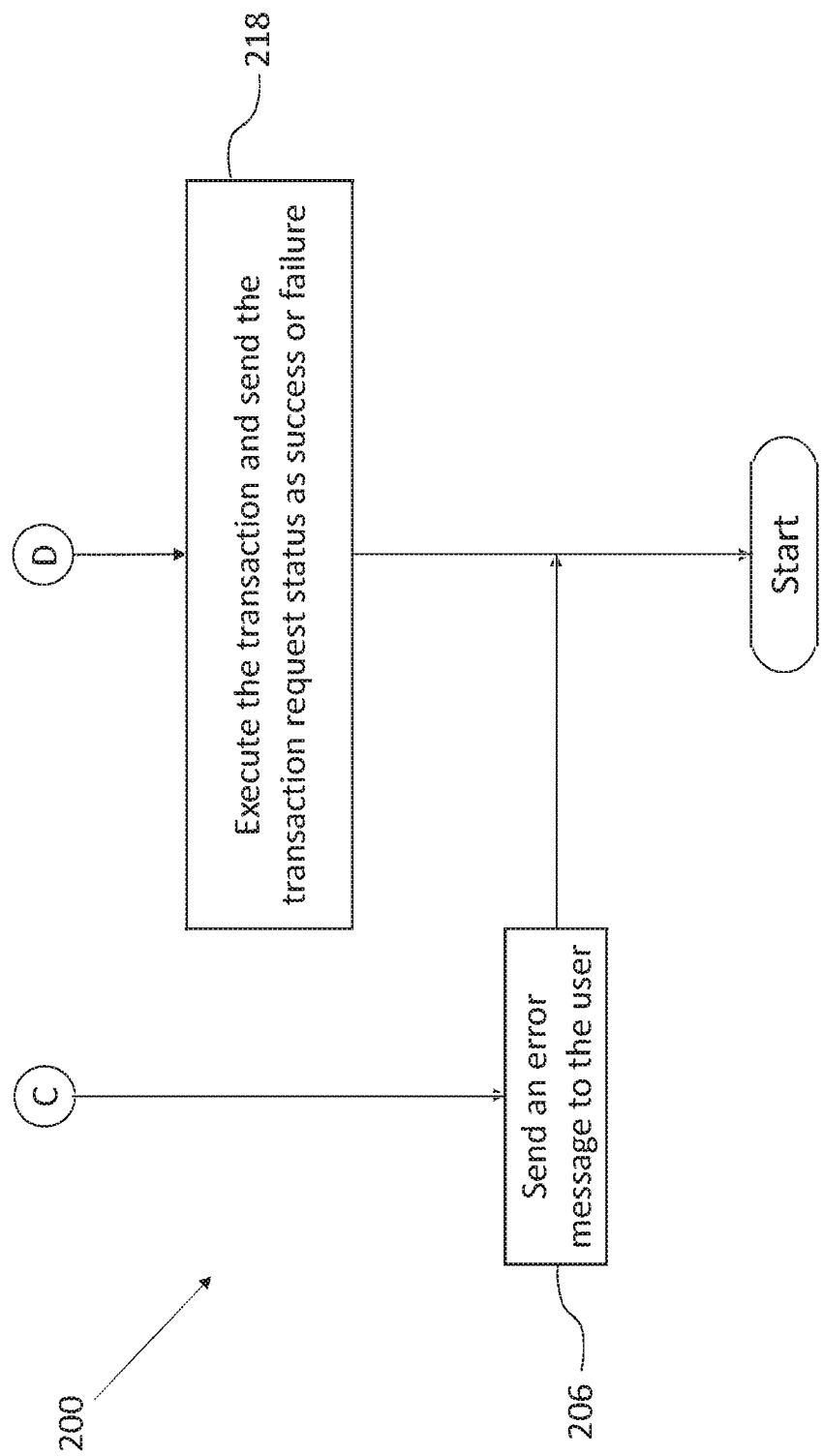

In operation, a flowchart 200 illustrating the steps involved in executing the transaction request using a communication channel is shown in FIG. 2. Initially at step 202, the transaction request is received from the transaction engine 102. The transaction request can be a proactive request or a reactive request. The transaction request comprising a transaction request ID, a transaction type, a user ID, an organization ID, a short code, a reply capture ID code (RCID code) and a message.

At step 204, the validity of the short code in the transaction request is checked by the short code validation module 112 present in the processor 108. At step 206, an error message is sent to the user if the short code is invalid, else at step 208, the presence of the RCID code in the transaction request is checked by the RCID code checking module 114.

At step 210, the validity of the RCID code in the transaction request is checked by the RCID code validation module 116, if the RCID code is present. Otherwise at step 206, the error message is sent mentioning that the RCID code is invalid. At step 212, the validity of a user is check using the user ID by the user validation module 118. If the user is invalid then at step 206, the error message is sent mentioning that the user is invalid.

In the next step 214, once all the checks are completed the message from the transaction request is fetched by the fetching module 120 for further processing. At step 216, a solution specific API is invoked to process the transaction by passing the fetched message from the transaction request. And finally, at step 218, the transaction is executed and send a success-failure response to the user indicating a transaction request status.

According to an embodiment of the disclosure, the system 100 can be integrated with (short messaging service) SMS through mobile phone and email through internet as channels thus providing portability and hassle free environment to perform actions. Though it should be appreciated that the use of any other communication facility such as voice call, online messaging services etc. is well within the scope of this disclosure.

According to an embodiment of the disclosure, the system 100 can be integrated with the email as the communication channel as shown in the schematic diagram of FIG. 3. In this case the transaction is done in the form of email/mail using an email ID. The request could be a reactive or a proactive. In case of reactive request, the user responds to the email/mail received. The mail from the user reaches the email reply capture mailbox 126. The mail box is polled every 15 minutes with the help of an email parser 128. The email parser 128 is a java based scheduler and check if any mail are there in the mail box which are unprocessed. If an unprocessed mail is found, the mail is picked for processing. Similarly, in case of proactive request, the mail is initiated by the user and sent to the email reply capture mail box 126. The mail is then picked by the java based scheduler for processing. In the next step, an email reply capture core processing framework 130 or an email processor 130 reads the mail and looks for the short code in the subject line. It should be appreciated that the email processor 130 is same as the processor 108 described in the embodiment of FIG. 1. The short code (for example WF for workflow, HD for Help Desk) is prepended with '' while sending the communication. Hence the email processor 130 looks for '' in subject line and anything post '**' is taken as the short code.

In the next step, once short code is checked the validity for short code is checked by conducting a look up in the table for the short code. If there is a valid entry present in the database 104 for this short code and a class is present against the short code, the email processor 130 proceeds for further processing else failure message is sent to end user stating that short code sent in mail is not valid.

In the next step, the mail is processed to fetch the RCID code from the mail. The entire mail is read and looked for the RCID code. The RCID code is appended with "Reply Capture Id" followed by the RCID code for example something like "KgOAPdB4". The email processor 130 looks for the string "Reply Capture Id:" and any character post this is taken as the RCID code. If there is no RCID code, then the email is considered as proactive use case and taken for further processing. If the RCID code is fetched from mail, validations are done to ensure that the RCID code is valid. This is done by first querying the table to check whether the RCID code is present in table or not. Whenever any action is taken the RCID code is consumed, or within 15 days the RCID code is consumed, hence on fetching the RCID code, the table is queried to check whether the RCID code is present. If the RCID code is present then processing proceeds else message is sent to user saying the RCID code is invalid.

Further, if the RCID code is present in the table then further validation is done to ensure that mail response has come from the authentic person to whom the mail was actually sent. For this the user Id stored in table at time of the RCID code generation is queried to fetch the email Id tagged to this user and the email Id from which response has been received is checked. If both the email Ids are same then, the user is considered as authentic user and processed else failure message is sent to end user. In the case of proactive use cases, there is no RCID code hence the RCID validation check is not there. In such cases, to ensure mail has come from authenticated user, it is checked that the mail Id is registered in the email reply capture core processing framework 126. If registration is done then this mail is processed further for taking action else user friendly message is sent to end sure saying mail Id to take action is not registered.

In the next step once all the validation stated above are successful, then the caption or the action item is fetched from the mail. This is the first line of the mail body. The first line of mail body is then processed and taken as caption and an xml is prepared with the caption, the RCID code etc. The short code is queried in table and the business logic class mapped to this short code is fetched and executed with the message xml as input. The entire business logic is executed and based on action taken, success and failure response is send back to user saying the status of action. And finally, once the action has been taken, the mail is deleted from the mail box and the RCID code is also deleted from the database 104.

According to another embodiment of the disclosure, the system 100 can also be integrated with the short messaging service (SMS) as the communication channel as shown in the schematic diagram of FIG. 3. In this case the transaction is done in the form of SMS using a mobile number. As mentioned above the SMS transaction request can be reactive or proactive request. In case of reactive request, the user responds to the SMS received by sending the response to the Virtual Mobile Number (VMN) number stated in the communication received by user. The response from user is fetched and converted in a response XML with details: Login ID, password, Mobile number, VMN Number, organization ID and response text message. This XML is passed as input to the service class exposed by an SMS reply capture core processing framework 132 or an SMS processor 132. It should be appreciated that the SMS reply capture core processing framework 132 is same as the processor 108 described in the embodiment of FIG. 1. In case of proactive request, the SMS is initiated by the user and sent to VMN number. The SMS from user is fetched and converted in a response XML with details: Login Id, password, Mobile number, VMN Number, organization ID and response text message. This XML is passed as input to the service class exposed by the SMS reply capture core processing framework 132.

In the next step, once the XML is received by the service class, the XML is parsed using an SMS parser 132 and the data within the xml is stored in java based data collection objects. Further the login ID/Password are checked to ensure that the response/message for processing is coming from an authentic source. If the login ID and password does not match then an error message is sent to the user.

In the next step, once the login ID/password match, details such as mobile number is queried in table to ensure that the reply has come from authenticated user. If the mobile number is registered in table the message is moved for further processing else error is returned and sent to user. The organization ID mapped against this mobile number is also fetched for further processing. Further, once it has been validated that the mobile number is a registered valid number, then the VMN number present in the response is checked to be configured for the organization. For this the database 104 is queried to check the mapping of VMN number and organization ID fetched from the mobile number. If the mapping of VMN number is not found then error while processing SRC is updated in database.

In the next step, once the validations are done, then the SMS reply capture core processing framework 132 reads the SMS and looks for the short code in the message body. The short code (for example WF for workflow, HD for Help Desk) is fetched by the SMS reply capture core processing framework 132. While the notification was sent to user it also mentioned the format of response which is expected from end user. Hence the first keyword in the SMS is fetched as Short code and taken for further processing.

In the next step, once the short code is checked, then the validity for the short code is checked by conducting a look up in the table for the short code. If there is a valid entry present in the database 104 for this short code and a class is present against the short code, the SMS reply capture core processing framework 132 proceeds for further processing else failure message is sent to end user stating that short code sent in mail is not valid. Along with the short code there is a mapping maintained in table for whether the short code is a reactive or proactive use case. This flag is fetched against the short code.

In the next step, if the request is a proactive request, the organization ID and user ID are extracted from the mobile number and input xml is generated with all the details captured such as organization ID, user ID, short code etc. While in the case of reactive request, the SMS is processed to fetch the RCID code. If the RCID code is present in table then further processing is done, else a failure message is sent to the user. If the RCID code is fetched from SMS, validations are done to ensure that the RCID code is valid. This is done by first querying the table to check whether RCID is present in table or not. Whenever any action is taken the RCID code is consumed or within 15 days the RCID code is consumed, hence on fetching RCID, the table is queried to check whether RCID is present. If present processing proceeds else message is sent to user saying the RCID code is invalid.

In the next step, if the RCID code is present in the table then further validation is done to ensure that response has come from authentic person to whom the mail was actually sent. For this the user Id stored in table at time of the RCID code generation is queried to fetch the mobile number tagged to this user and the mobile number from which response has been received is checked. If both numbers are same then, the mail is considered as authentic mail and processed else failure message is sent to end user. In case of proactive requests, there no RCID code hence the RCID code validation check is not there. In such cases, to ensure SMS has come from the authenticated user, it is checked that the mobile number is registered in our SMS reply capture core processing framework 132. If registration is done then this SMS is processed further for taking action else user friendly message is sent to end sure saying mobile number to take action is not registered. Finally, once all the validation stated above are successful, the caption (action) is fetched from the mail. The caption is fetched and an xml is prepared with the caption, the RCID code etc. The short code is queried in table and the business logic class mapped to this short code is fetched and executed with the message xml as input. The entire business logic is executed and based on action taken, success and failure response is send back to user saying the status of action.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims. The embodiment, thus provides the system and method for securely executing a transaction request using a communication channel.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example. The preceding description has been presented with reference to various embodiments. Persons having ordinary skill in the art and technology to which this application pertains will appreciate that alterations and changes in the described structures and methods of operation can be practiced without meaningfully departing from the principle, spirit and scope. It is intended that the disclosure and examples be considered as exemplary only, with a true scope and spirit of disclosed embodiments being indicated by the following claims.

What is claimed is:

1. A method for securely executing a transaction request using a communication channel, the method comprising a processor implemented steps of:
   generating and sending a transaction request by a transaction engine, wherein the transaction request comprising a user ID, a short code, a reply capture ID code (RCID code) and a message, wherein a user responds to the transaction request via the communication channel to execute the transaction request, wherein the communication channel is one of a short messaging service or an email service;
   receiving the response to the transaction request from the user; and
   executing the transaction request based on the response, wherein the execution of the transaction request comprises:
   checking a validity of the short code in the transaction request by checking presence of the short code in a database table and checking presence of a business logic class mapped with the short code, and sending an error message if the short code is invalid, else when the short code is valid checking presence of the RCID code in the transaction request; and checking validity of the RCID code in the transaction request if the RCID code is present in the transaction request, wherein validity of the RCID code is checked by checking presence of the RCID code in a RCID code table, and sending an error message if the RCID code is invalid, else;

checking validity of the user using the user ID, and sending an error message if the user is invalid, else when the user is valid, fetching a first line of email body containing one or more action items, by an email parser or fetching the SMS by a SMS parser, and preparing an xml from the first line of the email body or from the SMS;

invoking a solution specific API to process the transaction request by querying the short code from the transaction request in the database table to fetch the business logic class mapped with the short code; and executing the transaction request by executing the business logic class along with the xml and sending a success-failure response to the user indicating a transaction request status.

2. The method of claim 1, wherein the transaction request further comprises a transaction request ID, a transaction type, a user ID, an organization ID, and wherein the transaction request is a proactive transaction request or a reactive transaction request, wherein the proactive transaction request is generated by the user proactively via the transaction engine by sending an email or SMS and the reactive transaction request is generated by the transaction engine reactively and the user responds to the reactive transaction request to execute the reactive transaction request.

3. The method of claim 1 further comprising polling one or more message boxes containing the transaction request received from the transaction engine.

4. The method of claim 1 further comprising deleting the transaction request from one or more message boxes and deleting the corresponding RCID after execution of the transaction request.

5. The method of claim 1, wherein the transaction is processed via a centralized ERP system.

6. A system for securely executing a transaction request using a communication channel, the system comprising:
a memory;
a transaction engine for generating and sending the transaction request, wherein the transaction request comprising a user ID, a short code, a reply capture ID code (RCID code) and a message, wherein a user responds to the transaction request via the communication channel to execute the transaction request, wherein the communication channel is one of a short messaging service or an email service;
a database for storing the transaction request; and
a processor coupled to the memory and configured to perform operations comprising,
an execution instruction to receive the response to the transaction request from the user; and execute the transaction request based on the response, wherein to execute the transaction request,
a short code validation instruction for checking a validity of the short code in the transaction request by checking presence of the short code in a database table and checking presence of a business logic class mapped with the short code and sending an error message if the short code is invalid, else when the short code is valid,
an RCID code checking instruction checking presence of the RCID code in the transaction request, and
an RCID code validation instruction for checking the validity of the RCID code in the transaction request if the RCID code is present in the transaction request, wherein validity of the RCID code is checked by checking presence of the RCID code in a RCID code table, and sending an error message if the RCID code is invalid, else
a user validation instruction for checking a validity of the user using the user ID, and sending an error message if the user is invalid, else when the user is valid,
a fetching instruction for fetching a first line of email body containing one or more action items, by an email parser or fetching the SMS by a SMS parser, and preparing an xml from the first line of the email body or from the SMS,
an invoke instruction for invoking a solution specific API to process the transaction request by querying the short code from the transaction request in the database table to fetch the business logic class mapped with the short code, wherein the short code is queried to fetch the business logic mapped with the short code, and
the execution instruction for executing the transaction request by executing the business logic class along with the xml and send a success-failure response to the user indicating a transaction request status.

7. The system of claim 6, wherein the RCID code is an eight character alphanumeric string.

8. The system of claim 6, wherein the RCID code is deleted after the completion of the transaction.

9. The system of claim 6, wherein the operations further comprise a polling instruction for polling one or more message boxes containing the transaction request received from the transaction engine.

10. A non-transitory computer readable medium storing instructions which when executed by a possessor on a system, cause the processor to perform a method for securely executing a transaction request using a communication channel, the method comprising:
generating and sending a transaction request by a transaction engine, wherein the transaction request comprising a user ID, a short code, a reply capture ID code (RCID code) and a message, wherein a user responds to the transaction request via the communication channel to execute the transaction request, wherein the communication channel is one of a short messaging service or an email service;
receiving the response to the transaction request from the user; and executing the transaction request based on the response, wherein execution of the transaction request comprises:
checking a validity of the short code in the transaction request by checking presence of the short code in a database table and checking presence of a business logic class mapped with the short code, and sending an error message if the short code is invalid, else when the short code is valid
checking presence of the RCID code in the transaction request; and
checking validity of the RCID code in the transaction request if the RCID code is present in the transaction request, wherein validity of the RCID code is checked by checking presence of the RCID code in a RCID code table, and sending an error message if the RCID code is invalid, else;

checking validity of the user using the user ID and sending an error message if the user is invalid, else when the user is valid, fetching a first line of email body containing one or more action items, by an email parser or fetching the SMS by a SMS parser, and preparing an xml from the first line of the email body or from the SMS;

invoking a solution specific API to process the transaction request by querying the short code from the transaction request in the database table to fetch the business logic class mapped with the short code; and executing the transaction request by executing the business logic class along with the xml and sending a success-failure response to the user indicating a transaction request status.

\* \* \* \* \*